Feb. 26, 1946.  E. C. SCOTT  2,395,586
TOOL DRIVE
Filed Oct. 7, 1942  2 Sheets-Sheet 1
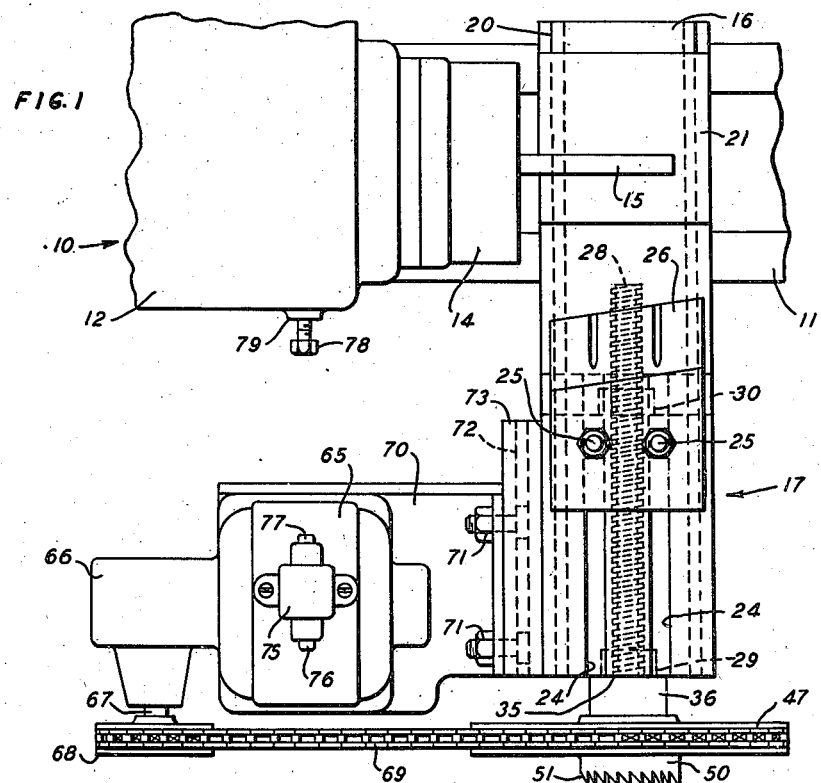
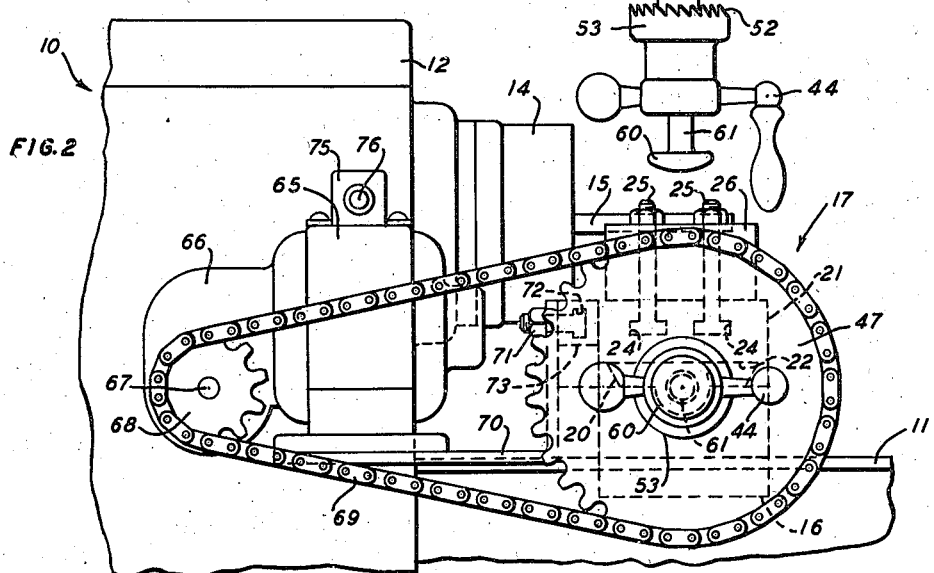
INVENTOR
E. C. SCOTT
BY
E.R. Nowlan
ATTORNEY

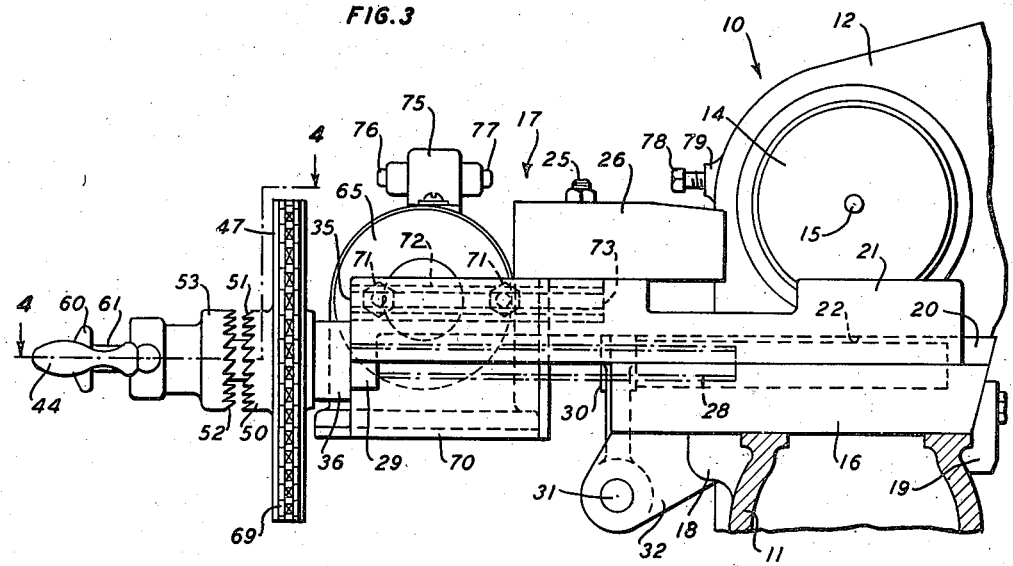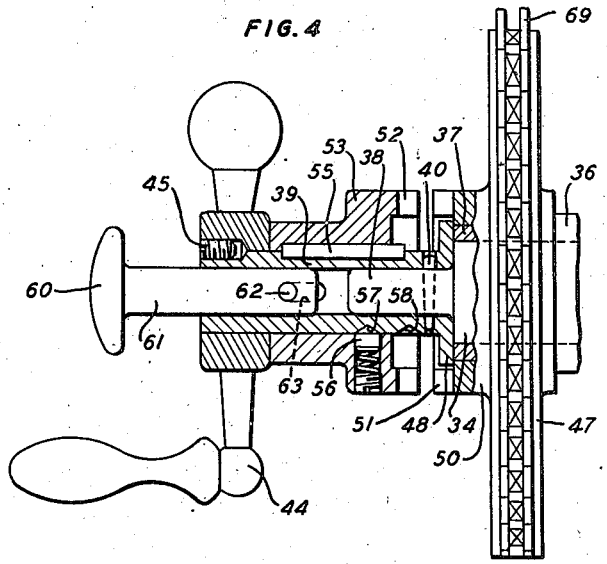

Patented Feb. 26, 1946

2,395,586

UNITED STATES PATENT OFFICE 2,395,586

TOOL DRIVE

Edward C. Scott, Cranford, N. J., assignor to Western Electric Company, Incorporated, New York, N. Y., a corporation of New York Application October 7, 1942, Serial No. 461,185

2 Claims. (Cl. 82—24)

This invention relates to tool drives, and more particularly to tool drives for hand-operated screw machines.

In certain types of hand-operated screw machines it has been found that the continuous feeding of the tool holder cross slide, during the cutting operations, is rather fatiguing and that this fatiguing effect could be greatly reduced by the incorporation of a power driven means to drive the tool holder during such operations. Furthermore, it has been found that the uniformity of travel of the tool holders through the power means ofttimes produces more accurate results and at all times increases the production of such machines.

An object of the invention is to provide an efficient and highly practical combined manual and power driven tool holder for use in material working machines.

With this and other objects in view, the invention comprises a tool drive for a material working machine including a tool holder, the latter being adapted for movement in either direction relative to the work through manual control means, power means also being adapted at selected intervals to move the tool holder relative to the work.

Other objects and advantages will be apparent from the following detailed description when considered in conjunction with the accompanying drawings, wherein Fig. 1 is a fragmentary top plan view of a material working machine embodying the invention, portions thereof being shown in section;

Fig. 2 is a front elevational view of the structure shown in Fig. 1;

Fig. 3 is a fragmentary side elevational view of the structure shown in Fig. 1; and Fig. 4 is an enlarged fragmentary sectional view taken along the line 4—4 of Fig. 3.

Referring now to the drawings, the machine indicated at 10, and selected to illustrate the invention, is of the hand-controlled screw machine type having a bed 11 upon which a head 12 is mounted. The head 12 is of the conventional type, having a rotatable chuck 14 for supporting work 15. A base 16 for a tool supporting unit 17 is mounted upon the bed 11 by suitable means, such as a fixed lug 18 and a clamp 19. The base 16 is provided with a dovetail central portion 20 which extends the full length thereof for interengagement with a carriage 21 through a dovetail groove 22 in the latter. The groove 22, which is in the under surface of the carriage, extends substantially the full length of the carriage for movement of the carriage transversely of the bed 11 on the base 16. Longitudinal parallel grooves 24 (Fig. 3) in the upper surface of the carriage provide means, through the aid of bolts 25, for the mounting of a tool 26 in a selected position on the carriage. The structure of the tool is in the present instance immaterial, it being understood, however, that the tool is to be moved into the work 15 during rotation of the chuck 14.

A threaded shaft 28, having a smooth portion rotatable in a retaining collar 29 to maintain the shaft against longitudinal movement with respect to the carriage, projects inwardly through a nut 30. The nut 30 is threaded to provide a positive, yet sufficiently loose, connection with the threaded shaft and is pivotally supported, at 31, upon an arm 32 integral with the base 16. The threaded shaft has an enlarged portion 34 beginning at a front face 35 (Fig. 3) of the carriage 21 and extending through a spacing collar 36 in a sleeve bearing 37. An outermost portion 38 of the threaded shaft 28 is reduced as shown in Fig. 4 and projects into a sleeve 39, to which it is fixed by the aid of a pin 40. A crank 44 is fixedly mounted upon the sleeve 39, as indicated at 45, thus providing manually operable means for actuating the carriage by rotating the threaded shaft 28.

Power driven means is also provided to drive the carriage. This means includes a sprocket 47 mounted upon the bearing 37 for free rotation on the shaft, that is the portion 34 thereof. The sprocket 47 is held against axial movement relative to the shaft in one direction by the collar 36 and in the other by a flange portion 48 of the sleeve 39. A clutch member 50 is secured or formed integral with the sprocket 47, providing a series of teeth 51 for interengagement with teeth 52 of another clutch member 53. The clutch member 53 is keyed to the sleeve 39, as at 55, for continuous rotation with the shaft 28 through the rotation of the sleeve and is movable into two positions, namely a normal or inoperative position and an operative position. These positions are controlled by a spring pressed plunger 56 receivable in recesses 57 and 58 in the sleeve 39. At the present instance the plunger 56 is in the inoperative or normal position in registration with recess 57. When moved into registration with the recess 58, the plunger and the clutch member 53 will be in their operative positions. This movement is brought about through the aid of a button or actuable element 60 which has a shank portion 61 movably disposed in the sleeve 39 and provided with a pin 62 which extends through the shank and through diametrically opposed elongate apertures 63 in the sleeve and into the clutch member 53. Thus, by axial movement of the button or element 60, the clutch member 53 may be moved into and out of engagement with the clutch member 50.

The sprocket 47, during operation of the machine, is continuously driven by a power means such as a motor 65. In the present instance the motor is of the electrically operable type having a speed reducing unit 66 which, through a chain 69, drives the sprocket 47. The motor unit is mounted upon a bracket 70 which is adjustably secured to the carriage by the aid of screws 71, the latter being adjustably receivable in a T-shaped slot 72 of a flange 73 mounted upon the side wall of the carriage. A switch unit 75, mounted upon the motor 65, includes a start switch 76 and a stop switch 77, the former switch being manually actuable while the latter is operated by an adjustable stop screw 78. The stop screw is mounted at a suitable position, for example on a bracket 79 supported by the head 12.

Considering now the control or operation of the machine, let it be assumed that the chuck 14 is driven to rotate the work 15 in a suitable direction and that the selected tool 26 is mounted upon the carriage 21 at a desired position. At this time the operator may select either the manual or power driven means to move the carriage, or he may, if he so desires, use both. As illustrated, the clutch members 50 and 53 are in their open or inoperative positions. When in this position the operator may move the carriage by rotating the crank 44. Let it be assumed, however, that the power driven means is to be utilized. Therefore, by pressing the button 60 inwardly, or to the right (Fig. 4), the clutch member 53 may be moved into closed position in interengagement with the clutch member 50. The switch 76 may then be actuated, causing energization of the motor and rotary movement of the sprocket 47, the latter driving the shaft 28, through the clutch members 50 and 53, the sleeve 39 and the pin 40. The rotation of the threaded shaft relative to the nut 30 will cause inward movement of the carriage to move the tool toward and into engagement with the work. When the tool has completed its cut, the stop switch 77 will be actuated by the screw 78 to deenergize the motor. The power means may then be disconnected by pulling the button 60 outwardly, at which time the carriage may be returned to its starting position through the manual actuation of the crank 44. This return movement of the carriage requires little effort on the part of the operator. It is the movement of the carriage to move the tool during the cutting operation that requires considerable effort. This portion of the operation, however, through the power operating means, requires of the operator only the actuation of the button 60 and the switch 76. Furthermore, with the power drive the tool is moved uniformly. It will be apparent that through the aid of the plunger 56 and its recesses 57 and 58, the clutch member 53 is also located in either position, removing the possibility of any accidental connection or disconnection of the clutch members.

Although specific improvements of the invention have been shown and described, it will be understood that they are but illustrative and that various modifications may be made therein without departing from the scope and spirit of this invention as defined by the appended claims.

What is claimed is:

1. A tool drive attachment for a machine having a bed and a support for work, the tool drive attachment comprising a base formed for mounting on the bed relative to the work, a carriage mounted for movement on the base toward and away from the work, means for mounting a tool on the carriage, a motor mounted on the carriage and movable therewith, a threaded shaft rotatably supported by the carriage and longitudinally movable therewith, a threaded member through which the threaded shaft extends mounted upon the base, an element mounted for free rotation on the threaded shaft, means operatively connecting the motor to the element to cause rotation of the element upon energization of the motor, a manually actuable member fixedly mounted upon the outer end of the threaded shaft for rotating the shaft to move the carriage with the tool toward and away from the work, and a clutch member keyed to the manually actuable member and movable axially thereon to thereby operatively connect the element to the threaded shaft whereby power supplied by the motor rotates the shaft.

2. A tool drive attachment for a machine having a bed and a support for work, the tool drive attachment comprising a base formed for mounting on the bed relative to the work, a carriage mounted for movement on the base toward and away from the work, means for mounting a tool on the carriage, a motor mounted on the carriage and movable therewith, a threaded shaft rotatably supported by the carriage and longitudinally movable therewith, a threaded member through which the threaded shaft extends mounted upon the base, an element mounted for free rotation on the threaded shaft, means operatively connecting the motor to the element to cause rotation of the element upon energization of the motor, a manually actuable member fixedly mounted upon the outer end of the threaded shaft for rotating the shaft to move the carriage with the tool toward and away from the work, a clutch member keyed to the manually actuable member and movable axially thereon to thereby operatively connect the element to the threaded shaft whereby power supplied by the motor rotates the shaft, means to latch the clutch member in operative and inoperative engagement with the element, and means carried by the manually actuable member and actuable to move the clutch member in operative and inoperative engagement with the element.

EDWARD C. SCOTT.